(12) United States Patent
Koren et al.

(10) Patent No.: US 10,178,010 B2
(45) Date of Patent: Jan. 8, 2019

(54) AUTOMATED CONTROL OF DESCRIPTOR TYPE FOR PACKET TRANSMISSION

(71) Applicant: Mellanox Technologies, Ltd., Yokneam (IL)

(72) Inventors: Ran Koren, Haifa (IL); Elad Persiko, Kiryat Ono (IL); Ofer Hayut, Kvutzat Yavne (IL)

(73) Assignee: Mellanox Technologies, Ltd., Yokneam (IL)

( * ) Notice: Subject to any disclaimer, the term of this patent is extended or adjusted under 35 U.S.C. 154(b) by 39 days.

(21) Appl. No.: 15/390,504

(22) Filed: Dec. 25, 2016

(65) Prior Publication Data

US 2018/0183699 A1 Jun. 28, 2018

(51) Int. Cl.
*H04L 12/26* (2006.01)
*H04L 12/931* (2013.01)

(52) U.S. Cl.
CPC .......... *H04L 43/0894* (2013.01); *H04L 43/10* (2013.01); *H04L 49/358* (2013.01)

(58) Field of Classification Search
None
See application file for complete search history.

(56) References Cited

U.S. PATENT DOCUMENTS

| | | | |
|---|---|---|---|
| 6,594,270 B1 * | 7/2003 | Drummond-Murray | H04Q 11/0478 370/353 |
| 9,197,710 B1 * | 11/2015 | Matthews | G06F 17/24 |
| 2007/0214456 A1 * | 9/2007 | Casey | G06F 9/50 718/100 |

OTHER PUBLICATIONS

PCI Express® Base Specification, Revision 3.1, 1073 pages, Mar. 2014.

* cited by examiner

*Primary Examiner* — Anh Ngoc M Nguyen
(74) *Attorney, Agent, or Firm* — D. Kligler IP Services Ltd.

(57) ABSTRACT

A method for data communication includes submitting from a host processor to a network interface controller (NIC) during a first time period first work items instructing the NIC to transmit over a network packets containing respective data. The first work items include pointer-based work items, which contain a pointer to the respective data in a memory of the host processor, and inline work items, which contain the respective data. The performance of the NIC is measured in transmitting the packets during the first time period. During a second time period, subsequent to the first time period, the host processor submits second work items to the NIC while deciding automatically, under control of software running on the host processor and based on the measured performance during the first time period, how many of the second work items are to be pointer-based and how many are to be inline work items.

22 Claims, 3 Drawing Sheets

AUTOMATED CONTROL OF DESCRIPTOR TYPE FOR PACKET TRANSMISSION

FIELD OF THE INVENTION

The present invention relates generally to computer data communications, and particularly to interaction between a host processor and a network interface controller.

BACKGROUND

InfiniBand™ (IB) is a switched-fabric communications architecture that is widely used in high-performance computing. It has been standardized by the InfiniBand Trade Association. Computing devices (host processors and peripherals) connect to the IB fabric via a network interface controller (NIC), which is referred to in IB parlance as a channel adapter. Host processors (or hosts) use a host channel adapter (HCA), while peripheral devices use a target channel adapter (TCA).

Client processes running on a host processor, such as software application processes, communicate with the transport layer of the IB fabric by manipulating a transport service instance, known as a "queue pair" (QP), made up of a send work queue and a receive work queue (often referred to simply as a send queue and a receive queue). To send and receive messages over the network using a HCA, the client initiates work requests (WRs), which cause the HCA driver program to place work items, called work queue elements (WQEs), in the appropriate work queues. Normally, each WR has a data buffer associated with it, to be used for holding the data that is to be sent or received in executing the WQE. The HCA executes the WQEs and thus communicates with the corresponding QP of the channel adapter at the other end of the link. After it has finished servicing a WQE, the HCA typically writes a completion report, in the form of a completion queue element (CQE), to a completion queue, to be read by the client as an indication that the work request has been executed.

IB channel adapters implement various service types and transport operations, including remote direct memory access (RDMA) read and write operations, as well as send operations. Both RDMA write and send requests carry data sent by a channel adapter (known as the requester) and cause another channel adapter (the responder) to write the data to a memory address at its own end of the link. Whereas RDMA write requests specify the address in the remote responder's memory to which the data are to be written, send requests rely on the responder to determine the memory location at the request destination.

Although the above terminology and some of the embodiments in the description that follows are based on features of the IB architecture and use vocabulary taken from IB specifications, similar mechanisms exist in networks and I/O devices that operate in accordance with other protocols, such as Ethernet and Fibre Channel. The IB terminology and features are used herein by way of example, for the sake of convenience and clarity, and not by way of limitation.

SUMMARY

Embodiments of the present invention that are described hereinbelow provide efficient methods for interaction between a host processor and a NIC coupling the host processor to a network, as well as apparatus and software implementing such methods.

There is therefore provided, in accordance with an embodiment of the invention, a method for data communication, which includes submitting, during a first time period, from a host processor to a network interface controller (NIC) first work items instructing the NIC to transmit over a network packets containing respective data. The first work items include pointer-based work items, which contain a pointer to the respective data in a memory of the host processor, and inline work items, which contain the respective data. A performance of the NIC in transmitting the packets is measured during the first time period. During a second time period, subsequent to the first time period, second work items are submitted from the host processor to the NIC while deciding automatically, under control of software running on the host processor and based on the measured performance during the first time period, how many of the second work items are to be pointer-based and how many are to be inline work items.

In some embodiments, the method includes periodically repeating the steps of measuring the performance of the NIC in transmitting the packets during a given time period and deciding how many of the work items in a subsequent time period are to be pointer-based and how many are to be inline work items, based on the measured performance during the given time period.

In a disclosed embodiment, deciding how many of the second work items are to be pointer-based and how many are to be inline work items includes making different, respective decisions regarding numbers of the pointer-based and inline work items to submit for different packet sizes.

In a further embodiment, measuring the performance includes counting completion reports posted to the memory by the NIC upon completing execution of the work items. Alternatively, measuring the performance includes monitoring a rate of transmission of the packets by the NIC.

In some embodiments, deciding how many of the second work items are to be pointer-based and how many are to be inline work items includes determining that all of the second work items will be of a single type, either pointer-based or inline, during the second time period. In a disclosed embodiment, measuring the performance includes computing a first performance measure for transmission of the data packets in response to the pointer-based work items and a second performance measure for transmission of the data packets in response to the inline work items, and determining that all of the second work items will be of the single type includes selecting the single type based on a comparison of the first and second performance measures. Additionally or alternatively, measuring the performance includes detecting that the performance is limited by a rate at which the host processor is able to post the work items, and determining that all of the second work items will be of the single type includes deciding to submit only the pointer-based work items during the second time period.

In other embodiments, deciding how many of the second work items are to be pointer-based and how many are to be inline work items includes finding an optimal proportion between the pointer-based and inline work items to be submitted during the second time period. In one embodiment, finding the optimal proportion includes maximizing a throughput of transmission of the data to the network.

There is also provided, in accordance with an embodiment of the invention, computing apparatus, including a network interface controller (NIC), which is configured to transmit over a network packets containing respective data, and a memory. A host processor is configured to submit to the NIC, during a first time period, first work items instructing the NIC to transmit respective packets, the first work items including pointer-based work items, which contain a pointer to the respective data in a memory of the host processor, and inline work items, which contain the respective data. The host processor is configured to measure a performance of the NIC in transmitting the packets during the first time period, and to submit second work items to the NIC during a second time period, subsequent to the first time period, while deciding automatically, under control of software running on the host processor and based on the measured performance during the first time period, how many of the second work items are to be pointer-based and how many are to be inline work items.

There is additionally provided, in accordance with an embodiment of the invention, a computer software product, including a non-transitory computer-readable medium in which program instructions are stored, which instructions, when read by a computer cause the computer to submit to a network interface controller (NIC), during a first time period, first work items instructing the NIC to transmit over a network packets containing respective data, the first work items including pointer-based work items, which contain a pointer to the respective data in a memory of the host processor, and inline work items, which contain the respective data. The instructions cause the computer to measure a performance of the NIC in transmitting the packets during the first time period, and to submit to the NIC, during a second time period, subsequent to the first time period, submitting second work items while deciding automatically, under control of the program instructions and based on the measured performance during the first time period, how many of the second work items are to be pointer-based and how many are to be inline work items.

The present invention will be more fully understood from the following detailed description of the embodiments thereof, taken together with the drawings in which:

DETAILED DESCRIPTION OF EMBODIMENTS

Overview

Figures 1, 2:
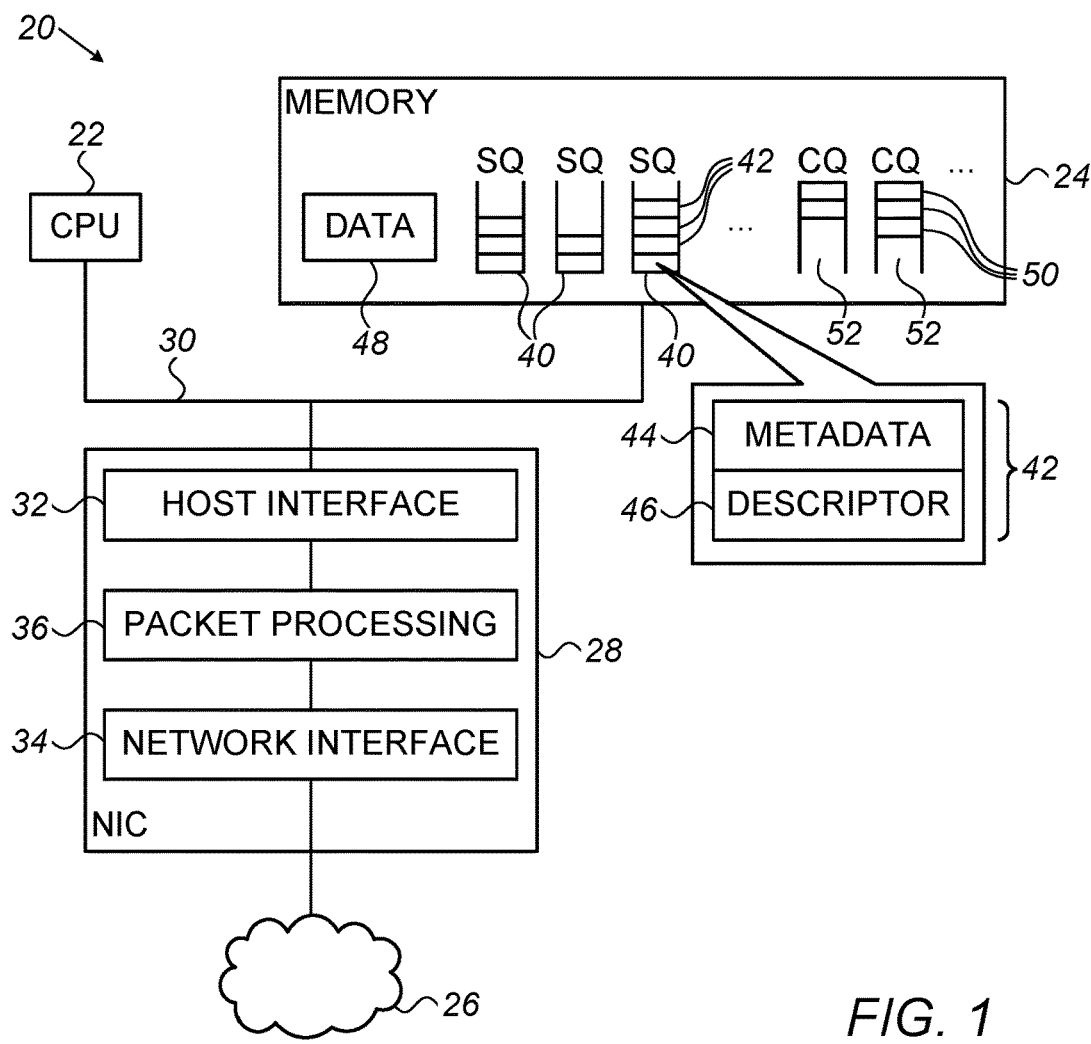
FIG. 1 is a block diagram that schematically illustrates a data communication system, in accordance with an embodiment of the present invention.
FIG. 2 is a flow chart that schematically illustrates a method for controlling interaction between a central processing unit (CPU) and a NIC, in accordance with an embodiment of the invention.

When a NIC driver program, running on the host processor of a computer, writes a work item to a given send queue, the work item typically contains both a buffer descriptor, with a pointer to the location of the data to be transmitted by the NIC, and metadata to be used by the NIC in assembling and transmitting a packet or packets containing the data. In some cases, however, the driver program may copy the actual data into the buffer descriptor of the work item, in place of the pointer. The data in such a work item is referred to herein as "inline data." Incorporation of inline data into the work item can be useful in increasing data transmission throughput and decreasing latency, particularly when the data size is small, since it enables the NIC to obtain all the information needed to construct and transmit a packet in a single memory access operation, using a single bus transaction.

On the other hand, copying data from the buffer specified by the client work request into the work item itself requires the driver program to consume many additional CPU cycles. Therefore, the use of inline data may not always give the desired performance improvement, and may even cause performance degradation when the CPU is heavily loaded.

The optimal choice of whether to use a pointer or to incorporate inline data in the work items depends on factors such as the data size, CPU load, features of the user application, traffic patterns, and numbers of transmitting processes. In systems that are known in the art, each QP is typically configured statically to use either pointer-based or inline work items, depending on expected use patterns. The factors affecting the optimal choice of work item type, however, often change over time. For this reason, a decision whether or not to incorporate inline data in the work items in a given send queue at one time may not be the correct decision at some later time, when conditions have changed.

Embodiments of the present invention that are described herein address this problem by enabling the host processor to dynamically evaluate and update the mix of pointer-based and inline work items that it submits to the NIC. (The term "pointer-based work items" refers to work items that contain a pointer to respective data in a memory of the host processor, while "inline work items" contain the actual data that the NIC is to insert in a corresponding data packet, as explained above.) During a given time period, the host processor submits pointer-based and inline work items to the NIC, and measures the performance of the NIC in transmitting the corresponding packets to a network. The processor then decides automatically (under control of software), based on the measured performance during the given time period, how many of the work items that it is to submit during the next time period are to be pointer-based and how many are to be inline work items. In subsequent time periods, the processor can periodically repeat the performance measurement and update its decision as to the mix of types of work items for each succeeding time period.

In some cases, the processor finds an optimal proportion between pointer-based and inline work items to be submitted during the next time period, for example, the proportion that will maximize the throughput of transmission of data to the network. Alternatively, the processor may determine that during the next time period, all of the work items will be of a single type, either pointer-based or inline. For example, upon detecting that the performance of the NIC in transmitting packets is limited by the rate at which the host processor is able to post the work items, the processor may decide to submit only pointer-based work items during the next time period.

In any case, the optimal choice of the numbers of pointer-based and inline work items to submit typically depends on the size of the data to be inserted in each of the packets. Therefore, in some embodiments, the processor makes different, respective decisions regarding the numbers of the work items of each type to submit for different packet sizes. The processor may decide, for example, that all work items with data below a certain size will contain the data inline, while those with data above this size will contain pointers to the data.

The processor can measure the performance of the NIC in various ways. For example, in one embodiment, the processor counts completion reports posted to the memory by the NIC upon completing execution of the work items. Additionally or alternatively, the processor monitors the rate of transmission of the packets by the NIC. In some embodiments, the processor computes one performance measure for transmission of data packets in response to the pointer-based work items and another performance measure for transmission in response to the inline work items, and selects the type of work items to submit during the next period based on a comparison of these performance measures.

System Description

FIG. 1 is a block diagram that schematically illustrates a data communication system 20, in accordance with an embodiment of the present invention. System 20 comprises a host processor, in the form of a central processing unit (CPU) 22, and a host memory 24 (also referred to as a system memory), which are connected to a suitable bus 30, such as a PCI Express® (PCIe) bus, as is known in the art. CPU 22 typically comprises multiple processing cores (not shown) and performs the functions described herein under the control of program instructions in software. This software may be downloaded to system 20 in electronic form, over a network, for example. Additionally or alternatively, the software may be stored in tangible, non-transitory computer-readable memory media, such as optical, magnetic, or electronic memory.

A NIC 28, such as an IB HCA, connects system 20 to a packet network 26. NIC 28 comprises a network interface 34, which is coupled to network 26, and a host interface 32, which connects to CPU 22 and memory 24 via bus 30. Packet processing circuitry 36, coupled between network interface 34 and host interface 32, generates outgoing packets for transmission over network 26, as described below, as well as processing incoming packets received from the network. Interfaces 32 and 34 and circuitry 36 typically comprise dedicated hardware logic, whose details will be apparent to those skilled in the art after reading the present description. Alternatively or additionally, at least some of the functions of circuitry 36 may be implemented in software on a suitable programmable processor.

To send messages to peers over network 26, client processes running on CPU 22, such as processes generated by application software, submit work requests for execution by NIC 28. The work requests typically specify data to be transmitted by means of a pointer to the location of a buffer in a data region 48 of memory 24.

A driver program running on CPU 22 processes the work requests to generate work items, such as WQEs 42, and places the WQEs in send queues (SQ) 40 in memory 24. Each WQE 42 comprises metadata 44, such as addressing and protocol information, to be used by NIC 28 in constructing packet headers and transmitting the corresponding packet or packets. In addition, each WQE 42 contains a descriptor 46 indicating the actual data to be contained in the packet payloads. Descriptor 46 may contain a pointer to the appropriate buffer in data region 48 of memory 24. Alternatively, for inline WQEs, the driver program copies the data from region 48 directly into descriptor 46, so that WQE 42 contains the actual data rather than a pointer to the data. As noted above and described further hereinbelow, the driver program is able to decide dynamically and automatically, under control of software, when to generate inline WQEs and when to use pointer-based WQEs. The driver sets a flag in the WQE (typically a single bit) to indicate whether the data following that bit comprise a pointer or the actual inline data.

NIC 28 reads WQEs 42 from queues 40 by means of direct memory access (DMA) transactions on bus 30, which are carried out by host interface 32. Packet processing circuitry 36 parses the WQEs and, specifically, determines whether each WQE is of the pointer-based or inline type. In the former case, host interface 32 performs a further bus transaction to read the data from the location indicated by the pointer in memory 24. In the latter case, when the WQE is of the inline type, this additional bus transaction is not required. Circuitry 36 then constructs one or more packets containing the data, using the information in metadata 44 of the WQE, and transmits the packets via network interface 34 to network 26.

Upon completing execution of a WQE 42, packet processing circuitry 36 writes a completion report, such as a CQE 50, to a designated completion queue (CQ) 52 in memory 24. Depending on the reliability requirements of the transport protocol, circuitry 36 may write the CQE immediately after sending the message called for by the WQE, or it may wait until an acknowledgment has been received from the message destination. Client processes running on CPU 22 read CQEs 50 from their assigned completion queues 52, and are thus able to ascertain that their work requests have been fulfilled.

Selecting and Updating WQE Types

FIG. 2 is a flow chart that schematically illustrates a method for controlling interaction between CPU 22 and NIC 28, in accordance with an embodiment of the invention. Specifically software running on CPU 22, such as the NIC driver program mentioned above, uses this method in deciding whether descriptors 46 in WQEs 42 should contain pointers to packet data or should themselves contain the data inline. The evaluation and decision described here may be carried out individually for each send queue 40, or for a group of the send queues together.

In one embodiment, to begin the method of FIG. 2, CPU first waits for outgoing traffic through NIC 28 to stabilize (after an application starts transmitting data, for example), and then selects the type or types of WQEs—inline or pointer based—to transmit initially, at an initiation step 60. The distribution of pointer-based and inline WQEs in this initial period are typically set in advance. For instance, CPU 22 may post all pointer-based or all inline WQEs during the initial period, or it may post a predefined mix of the two types of WQEs. The WQEs themselves can be based on actual work requests submitted by a client process or processes.

In some embodiments, the choice of whether to post pointer-based or inline WQEs is made by a static control setting during each time period, such as setting a flag that indicates to the driver the type of WQEs it should post. For example, after allowing a certain period (such as 100 ms) for traffic to stabilize, CPU 22 may first post inline WQEs for 100 ms, followed by pointer-based WQEs for the next 100 ms. In an alternative embodiment, the driver may dynamically mix inline and pointer-based WQEs. The static approach is advantageous in that the WQE type is set in the control path and creates no additional burden on data path processing; whereas the dynamic approach enables CPU 22 to find the optimal mix of WQE types during each time period.

While NIC 28 transmits the packets, CPU 22 gathers statistics regarding packet transmission and computes corresponding performance measures, at an evaluation step 62. For example, CPU 22 may count the number of packets transmitted during each time interval, using statistics maintained in the data path. Thus, the CPU may discover that NIC 28 transmitted packets at a certain rate during the inline interval and at another rate (either lower or higher) during the pointer-based interval. These rates serve as performance measures and thus indicate generally, for a given packet size, whether the performance was limited more severely by CPU load (in which case pointer-based WQEs would tend to give better performance) or by transactions on bus 30 (in which case the performance of inline WQEs should be better). The decision may be made on the basis of the average packet size during the given time interval or differentially for different packet sizes.

Alternatively, CPU 22 may monitor completion reports, such as CQEs 50, in order to measure the performance of system 20 in executing WQEs 42. For this purpose, the NIC driver (or another software component running on the CPU) periodically polls completion queues 52 in order to detect whether a new CQE 50 has been posted by NIC 28 in response to WQEs 42 posted during the period under evaluation. In one embodiment, the CPU polls for CQEs frequently, for example immediately after posting each WQE. The percentage of polling attempts that discover a new CQE can serve as a performance measure, wherein the optimal balance between inline and pointer-based WQEs is the one that maximizes this measure. An example of an optimization method based on this CQE percentage is presented in FIG. 3.

Based on the performance measures gathered at step 62, CPU 22 updates the settings that are to be used by the driver in generating WQEs 42 during the next time period, at a descriptor updating step 64. For example, the CPU may set a ratio between the numbers of pointer-based and inline WQEs that will be submitted during the next time period. Alternatively, the CPU may decide that all of the WQEs will be of a single type, either pointer-based or inline, during the next time period. As noted earlier, different decisions may apply to different data sizes, so that WQEs invoking packets below a certain threshold size are posted as inline WQEs, while WQEs invoking packets above this threshold size are pointer-based, for example. Generally speaking, the settings are chosen with the aim of optimizing (i.e., maximizing) the throughput of data from memory 24 to NIC 28 to network 26.

During the next period, at a packet transmission step 66, CPU 22 posts WQEs 42 of the type or mixture of types that was found to be optimal at step 64. NIC 28 reads these WQEs and assembles and transmits packets accordingly. CPU 22 repeats steps 62 and 64, and thus continues to collect statistics, compute performance measures, and update its settings during this period. In this manner, the CPU may iteratively refine the settings in order to find the mix of inline and pointer-based WQEs that will maximize throughput. When a performance measure is found to have changed since the previous iteration, due to changes in CPU load or traffic levels, for example, the CPU may update the mix of inline and pointer-based descriptors at step 64 accordingly. These periodic updates enable system 20 to adapt to changes and optimize the choice WQE types automatically, without operator intervention.

Figure 3:
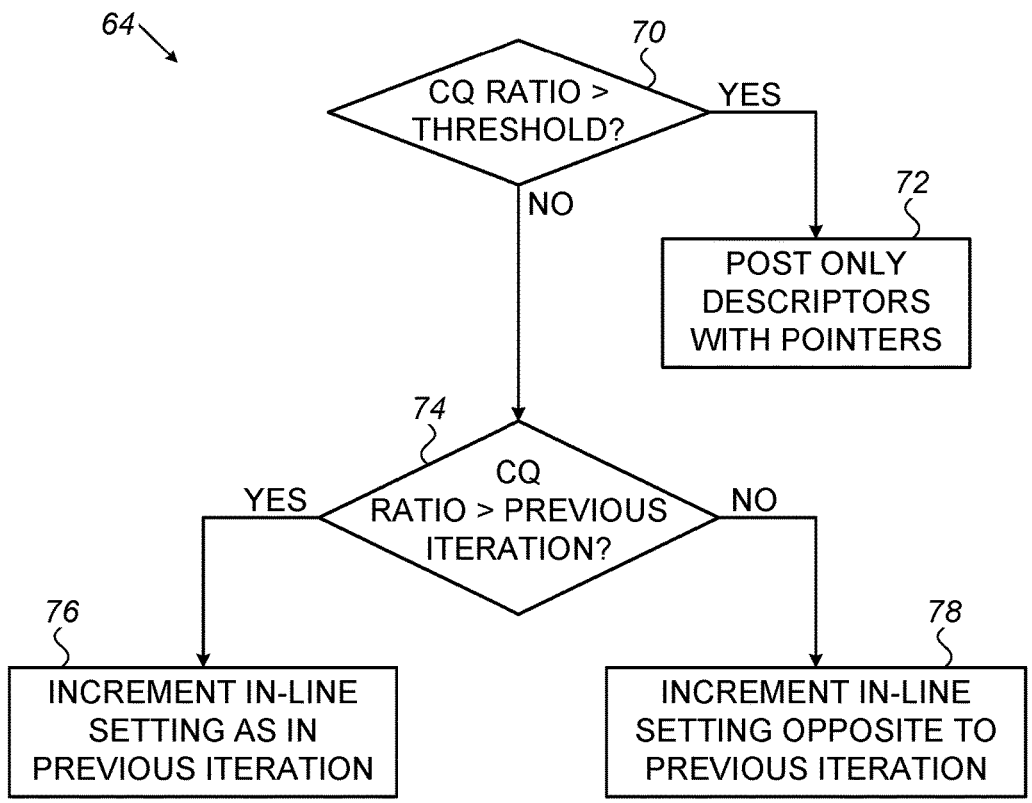
FIG. 3 is a flow chart showing a method for controlling the mode of posting work items by a CPU for execution by a NIC, in accordance with an embodiment of the invention.

FIG. 3 is a flow chart that schematically shows details of a method that can be used at step 64 in updating WQE descriptor settings, in accordance with an embodiment of the invention. This particular embodiment uses the percentage of polling attempts that discover a new CQE as a performance measure (referred to in FIG. 3 as the "CQ ratio"). Alternatively, the method described here can be applied, mutatis mutandis, using other sorts of performance measures.

During each time period under evaluation, CPU 22 compares the current CQ ratio to a predefined threshold, at a threshold checking step 70. The threshold may be set, for example, to 50% or 75%. A CQ ratio above this threshold indicates that NIC 28 is executing WQEs 42 as fast as CPU 22 is able to post them in queues 40, meaning that packet transmission performance is limited by a rate at which the is able to post the WQEs. In this case, CPU decides that during the next time period, only pointer-based WQEs will be posted, at a pointer decision step 72. This choice transfers at least a part of the processing burden from the CPU to the NIC.

Otherwise, if the current CQ ratio is below the threshold at step 70, CPU 22 compares the current CQ ratio to the CQ ratio computed during the previous time period, at a CQ comparison step 74. If the CQ ratio has increased by at least a certain minimal percentage, CPU 22 concludes that the most recent change in the proportion of inline WQEs relative to pointer-based WQEs was effective in increasing data throughput. Consequently, the CPU increments the proportion in the same direction as it did most recently, at an increment repetition step 76. Otherwise, if the CQ ratio has decreased by at least a certain minimal percentage, the CPU increments the inline/pointer-based proportion in the opposite direction to the most recent change, at an increment reversal step 78.

In this manner, the method of FIG. 3 leads to an optimal balance between inline and pointer-based WQEs. The optimization is dynamic over time and can respond to multiple different factors that will affect throughput.

Figure 4:
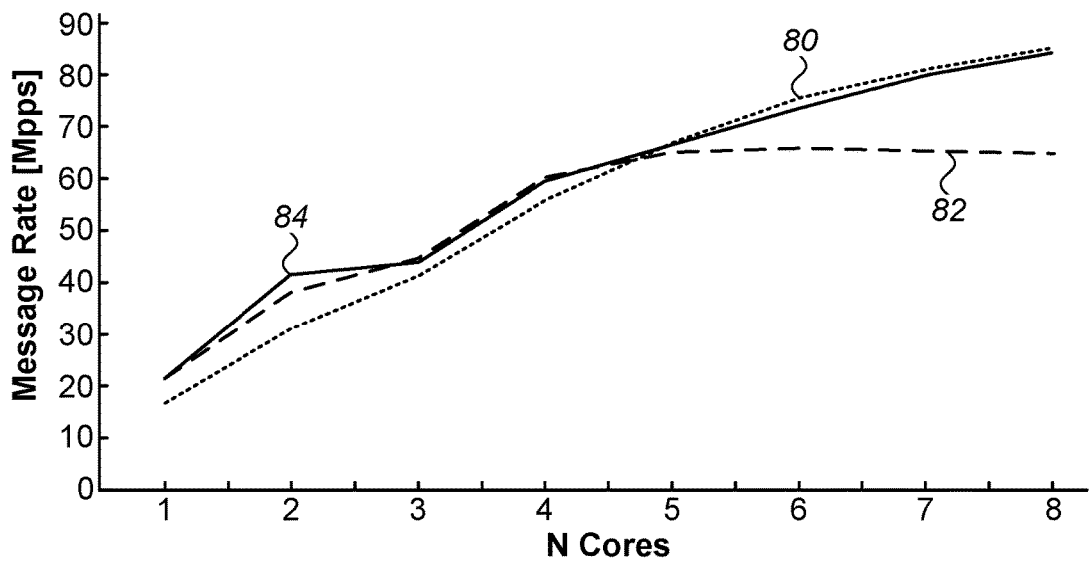
FIGS. 4 and 5 are plots that schematically illustrate message rates achieved by different modes of posting work items, in accordance with an embodiment of the invention.
Figure 5:
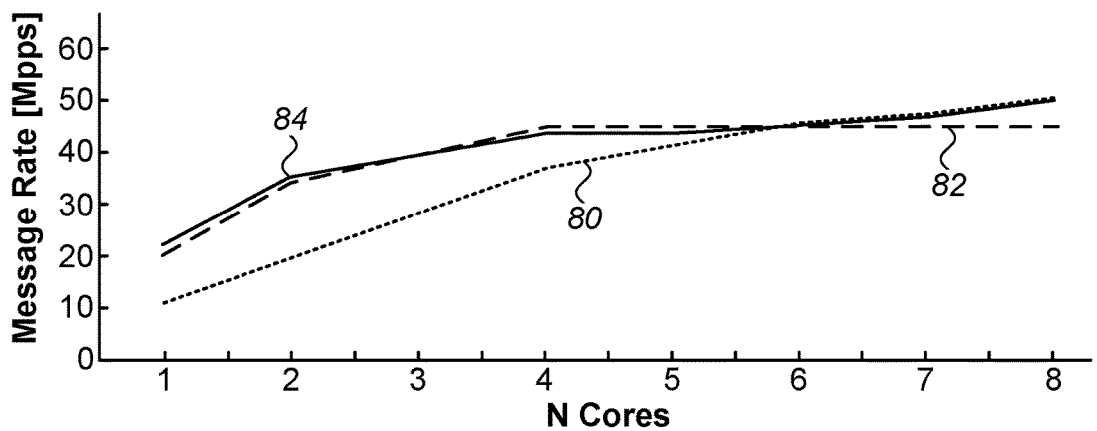

FIGS. 4 and 5 are plots that schematically illustrate message rates achieved by different modes of posting work items, in accordance with an embodiment of the invention. The plots show message rates, in millions of packets per second (Mpps), as a function of the number of CPU cores that are engaged in posting WQEs. FIG. 4 shows message rates for 64-byte packets, while FIG. 5 shows message rates for 128-byte packets. In each figure, a curve 80 shows the message rate for a scenario in which only inline WQEs are posted by the CPU, while a curve 82 shows the message rate when only pointer-based WQEs are posted. A solid curve 84 shows the message rates achieved when the method of FIG. 3, as described above, is used to decide dynamically on the relative numbers of inline and pointer-based WQEs that are to be posted.

In both of FIGS. 4 and 5, when CPU availability is low (in terms of the number of cores used), pointer-based WQEs are advantageous, as illustrated by curve 82. On the other hand, at high CPU availability, curve 82 flattens, as data access by NIC 28 becomes the limiting factor, and inline WQEs are preferred, as shown by curve 80. Automatic, dynamic selection of the numbers of inline and pointer-based WQEs, as illustrated by curve 84, is able to match or even exceed the performance of both static settings (inline and pointer-based) over all levels of CPU availability.

In the embodiments described above, each work request results in either a pointer-based WQE or an inline WQE. In an alternative embodiment, however, a combination of inline and pointer-based WQEs may be generated in response to certain work requests, so that part of the data is inserted in an inline WQE, while the remainder is referenced by a pointer-based WQE. By placing an appropriate part of the data in an inline WQE, the NIC driver is then able to write a subsequent WQE with a pointer that are aligned to a 64-byte line for better memory access performance.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data communication, comprising:
    during a first time period, submitting from a host processor to a network interface controller (NIC) first work items instructing the NIC to transmit over a network packets containing respective data, the first work items comprising pointer-based work items, which contain a pointer to the respective data in a memory of the host processor, and inline work items, which contain the respective data;
    measuring a performance of the NIC in transmitting the packets during the first time period;
    selecting based on the measured performance during the first time period, a proportion of work items that are to be pointer-based and a proportion of work items that are to be inline work items; and
    during a second time period, subsequent to the first time period, performing by a software driver running on the host processor:
        receiving work requests specifying data to be transmitted by the NIC;
        generating, responsive to the received work requests, second work items for submission from the host processor to the NIC, while deciding automatically, for each work request, whether a corresponding generated second work item is pointer-based or inline, based on the selected proportions; and
        submitting the generated work items to the NIC.

2. The method according to claim 1, and comprising periodically repeating the steps of measuring the performance of the NIC in transmitting the packets during a given time period and deciding the proportion of the work items in a subsequent time period that are to be pointer-based and the proportion that are to be inline work items, based on the measured performance during the given time period.

3. The method according to claim 1, wherein deciding the proportion of the second work items that are to be pointer-based and the proportion that are to be inline work items comprises making different, respective decisions regarding numbers of the pointer-based and inline work items to submit for different packet sizes.

4. The method according to claim 1, wherein measuring the performance comprises counting completion reports posted to the memory by the NIC upon completing execution of the work items.

5. The method according to claim 1, wherein measuring the performance comprises monitoring a rate of transmission of the packets by the NIC.

6. The method according to claim 1, wherein deciding the proportion of the second work items that are to be pointer-based and the proportion that are to be inline work items comprises determining that all of the second work items will be of a single type, either pointer-based or inline, during the second time period.

7. The method according to claim 6, wherein measuring the performance comprises computing a first performance measure for transmission of the data packets in response to the pointer-based work items and a second performance measure for transmission of the data packets in response to the inline work items, and wherein determining that all of the second work items will be of the single type comprises selecting the single type based on a comparison of the first and second performance measures.

8. The method according to claim 6, wherein measuring the performance comprises detecting that the performance is limited by a rate at which the host processor is able to post the work items, and wherein determining that all of the second work items will be of the single type comprises deciding to submit only the pointer-based work items during the second time period.

9. The method according to claim 1, wherein deciding the proportion of the second work items that are to be pointer-based and the proportion that are to be inline work items comprises finding an optimal proportion between the pointer-based and inline work items to be submitted during the second time period.

10. The method according to claim 9, wherein finding the optimal proportion comprises computing maximizing a throughput of transmission of the data to the network.

11. A computing apparatus, comprising:
    a network interface controller (NIC), which is configured to transmit over a network packets containing respective data;
    a memory; and
    a host processor, which is configured to submit to the NIC, during a first time period, first work items instructing the NIC to transmit respective packets, the first work items comprising pointer-based work items, which contain a pointer to the respective data in a memory of the host processor, and inline work items, which contain the respective data,
    wherein the host processor is configured to measure a performance of the NIC in transmitting the packets during the first time period, to select based on the measured performance during the first time period, a proportion of work items that are to be pointer-based and a proportion of work items that are to be inline work items, and to perform by a software driver running on the host processor, during a second time period, subsequent to the first time period:
        receiving work requests specifying data to be transmitted by the NIC,
        generating second work items, responsive to the received work requests, while deciding automatically, for each work request, whether a corresponding generated second work item is pointer-based or inline, based on the selected proportions; and
        submitting the generated work items to the NIC.

12. The computing apparatus according to claim 11, wherein the host processor is configured to periodically repeat the steps of measuring a performance of the NIC in transmitting the packets during a given time period and deciding the proportion of the work items in a subsequent time period that are to be pointer-based and the proportion that are to be inline work items, based on the measured performance during the given time period.

13. The computing apparatus according to claim 11, wherein the host processor is configured to make different, respective decisions regarding numbers of the pointer-based and inline work items to submit for different packet sizes.

14. The computing apparatus according to claim 11, wherein the host processor is configured to measure the performance by counting completion reports posted to the memory by the NIC upon completing execution of the work items.

15. The computing apparatus according to claim 11, wherein the host processor is configured to measure the performance by monitoring a rate of transmission of the packets by the NIC.

16. The computing apparatus according to claim 11, wherein the host processor is configured to decide that all of the second work items will be of a single type, either pointer-based or inline, during the second time period.

17. The computing apparatus according to claim 16, wherein the host processor is configured to compute a first performance measure for transmission of the data packets in response to the pointer-based work items and a second performance measure for transmission of the data packets in response to the inline work items, and to select the single type of the second work items based on a comparison of the first and second performance measures.

18. The computing apparatus according to claim 16, wherein the host processor is configured to detect that the performance is limited by a rate at which the host processor is able to post the work items, and consequently to decide to submit only the pointer-based work items during the second time period.

19. The computing apparatus according to claim 11, wherein the host processor is configured to find an optimal proportion between the pointer-based and inline work items to be submitted during the second time period.

20. The computing apparatus according to claim 19, wherein the host processor is configured to find the optimal proportion so as to maximize a throughput of transmission of the data to the network.

21. A computer software product, comprising a non-transitory computer-readable medium in which program instructions are stored, which instructions, when read by a computer cause the computer to submit to a network interface controller (NIC), during a first time period, first work items instructing the NIC to transmit over a network packets containing respective data, the first work items comprising pointer-based work items, which contain a pointer to the respective data in a memory of the host processor, and inline work items, which contain the respective data, wherein the instructions cause the computer to measure a performance of the NIC in transmitting the packets during the first time period, to select based on the measured performance during the first time period, a proportion of work items that are to be pointer-based and a proportion of work items that are to be inline work items, and to perform, during a second time period, subsequent to the first time period:
receiving work requests specifying data to be transmitted by the NIC,
generating second work items, responsive to the received work requests, while deciding automatically, for each work request, whether a corresponding generated second work item is pointer-based or inline, based on the selected proportions; and
submitting the generated work items to the NIC.

22. The method according to claim 1, wherein generating the second work items comprises generating inline work items for work requests relating to a data size below a given size and generating pointer-based work items for work requests relating to a data size above the given size.

* * * * *